United States Patent
Biehle et al.

(10) Patent No.: US 10,388,152 B2
(45) Date of Patent: Aug. 20, 2019

(54) DEVICE, METHOD AND COMPUTER PROGRAM FOR MAKING AVAILABLE INFORMATION ABOUT AN END OF A TRAFFIC JAM VIA A VEHICLE-TO-VEHICLE INTERFACE

(71) Applicant: VOLKSWAGEN AKTIENGESELLSCHAFT, Wolfsburg (DE)

(72) Inventors: Thomas Biehle, Groß Oesingen (DE); Holger Schultz, Falkensee (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 15/758,618

(22) PCT Filed: May 26, 2016

(86) PCT No.: PCT/EP2016/061915
§ 371 (c)(1),
(2) Date: Mar. 8, 2018

(87) PCT Pub. No.: WO2017/045779
PCT Pub. Date: Mar. 23, 2017

(65) Prior Publication Data
US 2018/0247527 A1    Aug. 30, 2018

(30) Foreign Application Priority Data
Sep. 17, 2015 (DE) .......................... 10 2015 217 792

(51) Int. Cl.
*G08G 1/01* (2006.01)
*G08G 1/16* (2006.01)
(Continued)

(52) U.S. Cl.
CPC ......... *G08G 1/0112* (2013.01); *G08G 1/0133* (2013.01); *G08G 1/0141* (2013.01);
(Continued)

(58) Field of Classification Search
None
See application file for complete search history.

(56) References Cited

U.S. PATENT DOCUMENTS

2007/0005231 A1* 1/2007 Seguchi ............... G08G 1/0104
                                                        701/117
2007/0124027 A1* 5/2007 Betzitza ................ B60W 40/02
                                                        701/1
(Continued)

FOREIGN PATENT DOCUMENTS

DE     19909276 A1    9/2000
DE     10103392 A1    8/2002
(Continued)

OTHER PUBLICATIONS

Search Report for International Patent Application No. PCT/EP2016/061915, dated Jul. 8, 2016.
(Continued)

*Primary Examiner* — Fekadeselassie Girma
(74) *Attorney, Agent, or Firm* — Barnes & Thornburg LLP (57) ABSTRACT

Devices, methods and computer programs for making available information about an end of a traffic jam via a vehicle-to-vehicle interface. The device for a transportation vehicle includes an apparatus to receive indicators about an end of a traffic jam. The indicators include at least one element of the group of kinetic information of the transportation vehicle or of transportation vehicles in an area surrounding the transportation vehicle and traffic jam warnings. The device also includes an apparatus to determine information about an
(Continued)

end of a traffic jam based on the indicators. The information about the end of a traffic jam indicates that the transportation vehicle will reach the end of a traffic jam in the near future. The device also includes a vehicle-to-vehicle interface to make available information about the end of a traffic jam to one or more other transportation vehicles via a vehicle-to-vehicle communication link.

21 Claims, 4 Drawing Sheets

(51) Int. Cl.
*H04W 4/46* (2018.01)
*G08G 1/0965* (2006.01)
*G08G 1/0967* (2006.01)

(52) U.S. Cl.
CPC ..... *G08G 1/0965* (2013.01); *G08G 1/096716* (2013.01); *G08G 1/096758* (2013.01); *G08G 1/096775* (2013.01); *G08G 1/096791* (2013.01); *G08G 1/162* (2013.01); *G08G 1/163* (2013.01); *H04W 4/46* (2018.02)

(56) References Cited

U.S. PATENT DOCUMENTS

| | | | | |
|---|---|---|---|---|
| 2015/0032289 | A1* | 1/2015 | Lotz | G08G 1/0112 701/1 |
| 2015/0138975 | A1* | 5/2015 | Gotz | G08G 1/093 370/235 |
| 2016/0210852 | A1* | 7/2016 | Buchholz | G08G 1/0112 |
| 2016/0247397 | A1* | 8/2016 | Xu | G08G 1/0125 |
| 2017/0367100 | A1* | 12/2017 | Sorrentino | H04W 16/14 |
| 2018/0095530 | A1* | 4/2018 | Rakshit | G06F 16/29 |
| 2018/0247527 | A1* | 8/2018 | Biehle | G08G 1/0112 |

FOREIGN PATENT DOCUMENTS

| | | |
|---|---|---|
| DE | 102009047097 A1 | 5/2011 |
| DE | 102012024166 A1 | 7/2013 |
| DE | 102012204098 A1 | 9/2013 |
| JP | 2013142958 A | 7/2013 |
| WO | 2013135535 A1 | 9/2013 |

OTHER PUBLICATIONS

Search Report for German Patent Application No. 10 2015 217 792.0, dated Jun. 22, 2016.

* cited by examiner

DEVICE, METHOD AND COMPUTER PROGRAM FOR MAKING AVAILABLE INFORMATION ABOUT AN END OF A TRAFFIC JAM VIA A VEHICLE-TO-VEHICLE INTERFACE

PRIORITY CLAIM

This patent application is a U.S. National Phase of International Patent Application No. PCT/EP2016/061915, filed 26 May 2016, which claims priority to German Patent Application No. 10 2015 217 792.0, filed 17 Sep. 2015, the disclosures of which are incorporated herein by reference in their entireties.

SUMMARY

Illustrative embodiments relate to devices, methods and computer programs for providing information about an end of a traffic jam via a vehicle-to-vehicle interface.

BRIEF DESCRIPTION OF THE DRAWINGS

Disclosed embodiments will be described in more detail in the following with reference to the drawings, to which embodiments overall are generally not limited. Shown are.

DETAILED DESCRIPTION

Vehicle-to-vehicle communication (also Car2Car, C2C, or Vehicle2Vehicle, V2V) and vehicle-to-infrastructure communication (also Car2Infrastructure, C2I, or Vehicle2Roadside, V2R) are a focal point of automotive research in the 21st century. The communication between transportation vehicles or between transportation vehicles or traffic infrastructure makes possible a large number of new options, for instance, a coordination of transportation vehicles with one another or a communication of transportation vehicles with the traffic infrastructure, for instance, to provide congestion warnings to the transportation vehicles. In this case, transportation vehicles that are designed for C2C or C2I (also summarized under vehicle-to-X communication, Car2X, C2X or Vehicle2X, V2X) possess a transmitting and receiving unit, to be able to communicate with other transportation vehicles, for instance, via direct radio links or mobile-radio networks. In these cases the communication, for instance, between transportation vehicles or between transportation vehicles and traffic infrastructure, may be limited within a radius of a few hundred meters. The communication between transportation vehicles via C2C or C2I may proceed in encrypted form, and it may be secured via certificates, for instance, via long-term certificates (LTC) or pseudonym certificates (PC) which are only valid for a limited time.

The driving of a transportation vehicle in road traffic is dependent on many factors, for instance, on the road layout, on traffic lights, obstacles, but, above all, on other road-users who are traveling on the same, often multi-lane, road. In this connection, dangerous driving situations frequently occur, perhaps because a dangerous situation arises at a place that is difficult to observe.

There is, therefore, a need to provide an improved concept to defuse dangerous driving situations and to improve driving safety of the transportation vehicles involved. This need is taken into account by devices and methods according to the independent claims.

Disclosed embodiments can achieve this by determining and providing information about an end of a traffic jam. A device for a transportation vehicle may, according to disclosed embodiments, be designed to establish, on the basis of indicators of an end of a traffic jam, whether the transportation vehicle is approaching an end of a traffic jam or is located at an end of a traffic jam. The traffic-jam indicators in this case may be based, for instance, on kinetic information pertaining to the transportation vehicle—that is to say, for instance, a speed, an acceleration or a direction of motion—on kinetic information pertaining to transportation vehicles in a neighborhood of the transportation vehicle, or on congestion warnings of other transportation vehicles or central systems, for instance, congestion-warning systems. These indicators can be combined, to increase a probability that the analysis will detect the end of a traffic jam. The information about the end of a traffic jam can then, for instance, be made available to other transportation vehicles, for instance, via a vehicle-to-vehicle interface, perhaps periodically as part of a Cooperative Awareness Message (CAM, a periodic message that is provided via vehicle-to-vehicle communication and that transmits a status of the transportation vehicle to other transportation vehicles) or in event-based manner as a so-called Decentralized Environmental Notification Message (DENM), for instance, to be presented as a warning by the other transportation vehicles.

Disclosed embodiments create a device for a transportation vehicle. The device includes an appliance designed to receive indicators of an end of a traffic jam. The indicators include at least one element of the group comprising kinetic information pertaining to the transportation vehicle, or to transportation vehicles in a neighborhood of the transportation vehicle, and congestion warnings. The device further includes an appliance designed to determine information about an end of a traffic jam on the basis of the indicators. The information about the end of a traffic jam indicates whether the transportation vehicle will reach the end of a traffic jam in the near future. The device further includes a vehicle-to-vehicle interface designed to provide the information about the end of a traffic jam to one or more further transportation vehicles via a vehicle-to-vehicle communication link. Other transportation vehicles that have received the information about the end of a traffic jam via a vehicle-to-vehicle interface may, for instance, utilize the congestion information to enhance driving safety, for instance, by displaying warnings. The utilizing of the indicators for the purpose of determination can increase a probability or accuracy of the determination and can make possible model-spanning and manufacturer-spanning standards for determining whether a transportation vehicle is located at the end of a traffic jam.

The provision of the information about the end of a traffic jam via the vehicle-to-vehicle interface may furthermore, for instance, reduce a delay in the transmission of the congestion information in comparison with a centralized solution. The provision of the information about the end of a traffic jam can, in addition, enhance driving safety.

In some disclosed embodiments, the kinetic information corresponds to speed information, acceleration information or steering-angle information. Utilizing the speed information, acceleration information or steering-angle information can enable a detection of a traffic-jam situation and of an end of a traffic jam, for instance, by an analysis of the information and by a comparison with known situations, situation patterns and limiting values.

In at least some disclosed embodiments, the congestion warnings include at least one element of the group comprising hazard-warning flashers of the transportation vehicle, hazard-warning flashers of transportation vehicles in a neighborhood of the transportation vehicle, information about a safety transportation vehicle, information about an end of a traffic jam from another transportation vehicle, or congestion-warning messages. Utilizing the congestion warnings can enable or define more precisely a detection of an end of a traffic jam, since knowledge of transportation vehicles that are located closer to the end of the traffic jam, or of centralized systems, can be utilized to verify a detection of the end of a traffic jam or to compute a probability of an end of a traffic jam.

In some disclosed embodiments, the appliance for receiving the indicators is designed to receive the congestion warnings via a vehicle-to-infrastructure communication link, a vehicle-to-vehicle communication link, via a mobile communication system, or via a sensor module. Receiving the indicators via a vehicle-to-vehicle communication link or a vehicle-to-infrastructure communication link can reduce a delay in the transmission of the congestion warnings or enhance topicality in comparison with a mobile communication system. Receiving the indicators via the mobile communication system can enable the further utilization of centrally collected or processed data which, for instance, may be based on many different indicators. Receiving the indicators via a sensor module can enable an analysis of the driving of transportation vehicles that do not have a vehicle-to-vehicle interface.

In some disclosed embodiments, the appliance for receiving the indicators may be designed to receive the congestion warnings via a Decentralized Environmental Notification Message, DENM, via the vehicle-to-vehicle interface. Receiving congestion warnings via an event-based DENM message can enhance the topicality of the congestion warnings.

In at least some disclosed embodiments, the appliance for determining the information about the end of a traffic jam is designed to determine that the transportation vehicle will reach the end of a traffic jam in the near future if the hazard-warning flashers of the transportation vehicle have been activated for at least a minimum duration within a measuring period, the hazard-warning flashers of transportation vehicles in a neighborhood of the transportation vehicle have been activated for at least a minimum duration within a measuring period, and the steering angle of the transportation vehicle during a further measuring period has been substantially less than an upper limiting value of the steering angle. By this, it can, for instance, be detected that both the driver of the transportation vehicle and other drivers detect an end of a traffic jam and are not perhaps turning off.

In some disclosed embodiments, the appliance for determining the information about the end of a traffic jam is designed to determine that the transportation vehicle will reach the end of a traffic jam in the near future if the steering angle of the transportation vehicle has been substantially less than an upper limiting value of the steering angle during a further measuring period, the transportation vehicle was decelerated from above an upper speed limit to below a lower speed limit, and wherein a further indicator indicates an end of a traffic jam. By this, a strong deceleration can be detected which may point to an end of a traffic jam and which in some cases by virtue of the detection of the steering angle can rule out turning off as the reason for the change in speed. The further indicator can increase a probability of detection.

In some disclosed embodiments, the further indicator may correspond to an activation of hazard-warning flashers of transportation vehicles in a neighborhood of the transportation vehicle for a minimum duration within a measuring period, to a reception of information about an end of a traffic jam from a further transportation vehicle, or to a reception of the congestion warnings from a plurality of further transportation vehicles, or to a reception of the information about a safety transportation vehicle. The further indicator can increase a probability of detection.

In some disclosed embodiments, the minimum duration may be, for instance, between 2 seconds and 5 seconds. The measuring period may, for instance, have a duration from 5 s to 30 s. The further measuring period may, for instance, have a duration between 30 s and 90 s. The upper speed limit may be, for instance, between 60 km/h and 100 km/h. The lower speed limit may be, for instance, between 20 km/h and 40 km/h. The utilization of the threshold values may, for instance, enable a reproducible, transferable or standardized determination of an end of a traffic jam.

In some disclosed embodiments, the vehicle-to-vehicle interface may furthermore be designed for vehicle-to-infrastructure communication. As a result, the device can, for instance, receive congestion warnings from a traffic infrastructure, or a relaying of the information about the end of a traffic jam to the traffic infrastructure is made possible, for instance, for a coordinated determination of an extent of a traffic jam or for a relaying of the information about the end of a traffic jam.

In some disclosed embodiments, the appliance may be designed to provide the information about the end of a traffic jam furthermore to a traffic infrastructure via the vehicle-to-vehicle interface. The relaying of the information about the end of a traffic jam to the traffic infrastructure can, for instance, be utilized for a coordinated determination of an extent of a traffic jam, or enable a relaying of the information about the end of a traffic jam.

In some disclosed embodiments, the appliance may, for instance, be designed to provide the information about the end of a traffic jam as a Cooperative Awareness Message, CAM, via the vehicle-to-vehicle interface. The provision of the information about the end of a traffic jam via CAM can, for instance, utilize the existing messages and enable a full-coverage periodic provision of the congestion information with a slight latency.

In some disclosed embodiments, the appliance for receiving the indicators may include a sensor module and/or an input interface. The utilizing of a sensor module may, for instance, enable an acquisition of transportation vehicles that are not equipped with a vehicle-to-vehicle interface. The input interface may enable a reception of indicators from other modules or entities. The appliance for determining the information about the end of a traffic jam may include a computation module and/or correspond to a computation module. For instance, the computation module can compare the indicators with threshold values or compute a probability that an end of a traffic jam is present.

Disclosed embodiments further create a method for a transportation vehicle. The method includes receiving indicators of an end of a traffic jam. The indicators include at least one element of the group comprising kinetic information pertaining to the transportation vehicle, or to transportation vehicles in a neighborhood of the transportation vehicle, and congestion warnings. The method further includes determining information about an end of a traffic jam on the basis of the indicators. The information about the end of a traffic jam indicates whether the transportation vehicle will reach the end of a traffic jam in the near future. The method further includes providing the information about the end of a traffic jam to one or more further transportation vehicles via a vehicle-to-vehicle communication link.

Disclosed embodiments further create a program having a program code for implementing the method when the program code is executed on a computer, a processor, a control module or a programmable hardware component.

Various embodiments will now be described in greater detail with reference to the accompanying drawings in which some embodiments are represented. In the figures, the thickness dimensions of lines, layers and/or regions may have been represented in exaggerated manner for the sake of clarity.

In the following description of the appended figures, which show merely some exemplary embodiments, the same reference symbols may designate the same or comparable components. Furthermore, synoptic reference symbols may be used for components and objects that occur several times in a disclosed embodiment or in a drawing but are described jointly as regards one or more features. Components or objects that are described by the same or synoptic reference symbols may have been constructed identically as regards individual, several or all features, for instance, their dimensions, but, where appropriate, may also have been constructed differently, unless anything else results explicitly or implicitly from the description.

Although disclosed embodiments may be modified and altered in various ways, embodiments in the figures are represented as examples and are described in detail herein. However, it should be made clear that it is not intended to restrict embodiments to the respectively disclosed forms, but rather that embodiments are to cover all functional and/or structural modifications, equivalents and alternatives that lie within the scope of the disclosure. Like reference symbols designate like or similar elements in the entire description of the figures.

It should be borne in mind that an element that is designated as being "connected" or "coupled" to another element may be connected or coupled to the other element directly, or intermediate elements may be present. If, on the other hand, an element is designated as being "directly connected" or "directly coupled" to another element, no intermediate elements are present. Other terms that are used to describe the relationship between elements should be interpreted in a similar manner (for example, "between" as opposed to "directly in between", "adjoining" as opposed to "directly adjoining", etc.).

The terminology that is used herein serves only for the description of certain disclosed embodiments and is not intended to restrict the disclosed embodiments. As used herein, the singular forms "a", "an" and "the" are also to imply the plural forms, unless the context unambiguously specifies otherwise. Furthermore, it should be made clear that expressions such as, for example, "contains", "containing", "exhibits", "includes", "including" and/or "exhibiting", as used herein, specify the presence of stated features, integers, operations, procedures, elements, and/or components but do not exclude the presence or addition of one or more features, integers, operations, procedures, elements, components and/or groups thereof.

Unless otherwise defined, all terms (including technical and scientific terms) used herein have the same meaning that an average technically skilled person in the field to which the disclosed embodiments pertain ascribes to them. Furthermore, it should be made clear that expressions, for example, those which are defined in generally used dictionaries, are to be interpreted as having the meaning that is consistent with their meaning in the context of the pertinent technology, and are not to be interpreted in an idealized or excessively formal sense, unless this is expressly defined herein.

A local detection of hazards can, for instance, be improved by utilizing a transmitter-and-receiver principle. A transmitter (a transportation vehicle traveling ahead) may be designed to detect whether it is approaching an end of a traffic jam, and to transmit this recognition to a recipient (transportation vehicle traveling behind) that can process this recognition and, for instance, can display a warning. At the time of recognition, the transmitter may, for instance, be surrounded on a freeway or expressway by stationary or stop-starting transportation vehicles. An ignition of the transmitter transportation vehicle is, for instance, activated (or the terminal 15), and the transportation vehicle could be designed to detect that it is on a freeway, perhaps via a speed profile, via a digital map, or via a camera). The triggering criteria for determining an end of a traffic jam can be updated or examined periodically or permanently.

Figure 1:
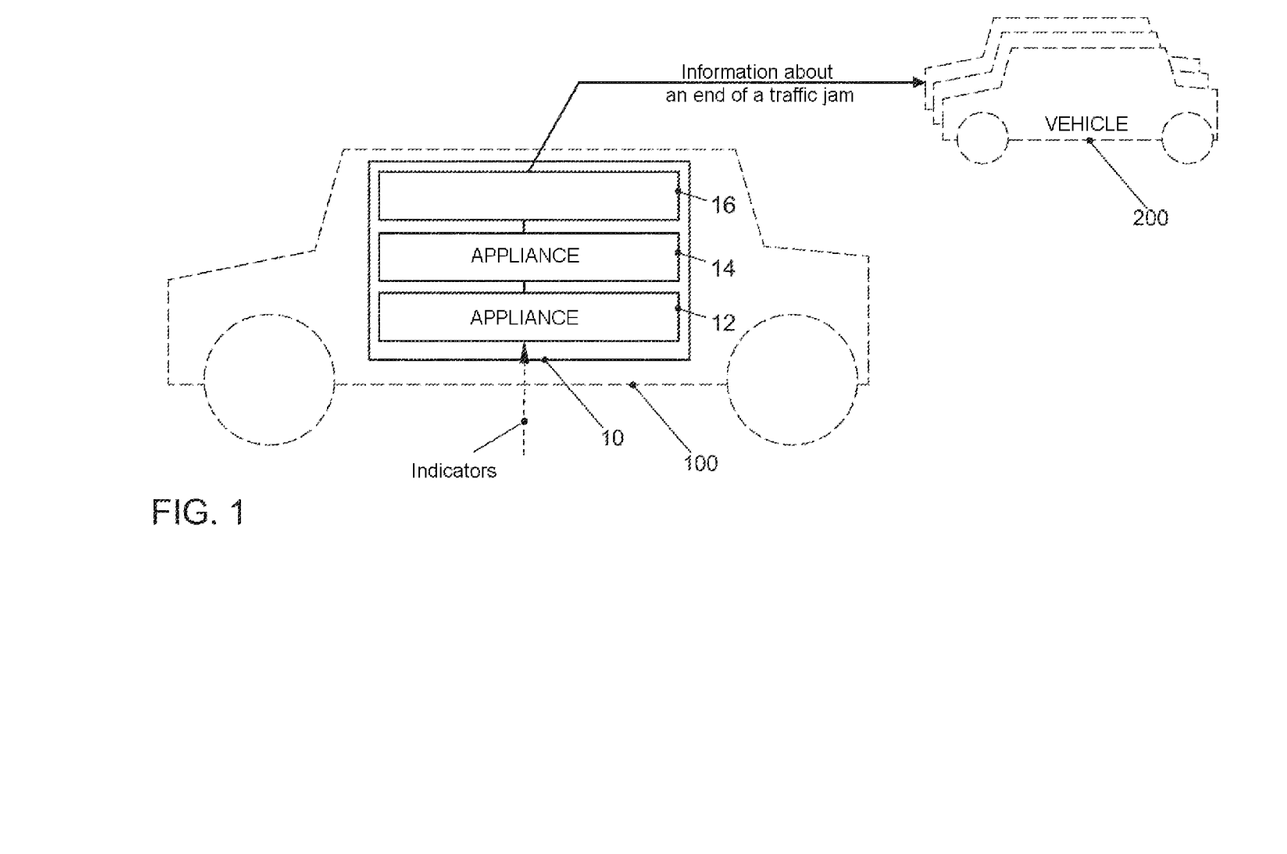
FIG. 1 illustrates a block diagram of a disclosed embodiment of a device for a transportation vehicle for providing information about an end of a traffic jam.

FIG. 1 illustrates a block diagram of a disclosed embodiment of a device 10 for a transportation vehicle 100. The device 10 includes an appliance 12 designed to receive indicators of an end of a traffic jam. The indicators include at least one element of the group comprising kinetic information pertaining to transportation vehicle 100, or to transportation vehicles in a neighborhood of transportation vehicle 100, and congestion warnings. The indicators may, for instance, be utilized to establish whether transportation vehicle 100 is approaching a traffic jam or is located at the end of a traffic jam. The kinetic information may correspond, for instance, to speed information, acceleration information or steering-angle information. Appliance 12 may, for instance, be designed to receive the kinetic information pertaining to transportation vehicle 100 via a CAN bus of the transportation vehicle, or a sensor module of appliance 12 may be designed to determine the kinetic information pertaining to transportation vehicle 100, for instance, relative to a traffic infrastructure or on the basis of a satellite navigation signal or on the basis of an acceleration sensor or speed sensor.

The kinetic information pertaining to the transportation vehicles in a neighborhood of transportation vehicle 100 can also be detected by appliance 12 via a sensor module, for instance, via an optical or acoustic transit-time sensor or via a video sensor. In this case, appliance 12 can, for instance, access one or more sensors of the transportation vehicle, for instance, parking sensors or sensors for at least partial automation of the transportation vehicle (for example, for adaptive cruise control). Appliance 12 may perhaps be designed to process raw data of the sensors, to determine the indicators, for instance, via an image analysis or a transit-time analysis. Alternatively or additionally, appliance 12 may, for instance, be designed to receive the kinetic information pertaining to the transportation vehicles in a neighborhood of the transportation vehicle via a vehicle-to-vehicle interface 16. For instance, the transportation vehicles in the neighborhood may be designed to make their kinetic information available to other transportation vehicles via periodic status messages. So-called Cooperative Awareness Messages (CAM) of a vehicle-to-vehicle standard are an exemplary embodiment of such status messages which appliance 12 can receive, for instance, via the vehicle-to-vehicle interface 16.

The congestion warnings may include at least one element of the group comprising hazard-warning flashers of transportation vehicle 100, hazard-warning flashers of transportation vehicles in a neighborhood of transportation vehicle 100, information about a safety transportation vehicle, information about an end of a traffic jam from another transportation vehicle, or congestion-warning messages. The congestion warnings can be received by appliance 12, for instance, via a vehicle-to-infrastructure communication link, a vehicle-to-vehicle communication link, or via a mobile communication system, perhaps via a Universal Mobile Telecommunication System (UMTS), a Long-Term Evolution (LTE) mobile communication system, or a mobile communication system of the 5th generation (5G). The congestion warnings in this case may include a periodic or event-dependent message which appliance 12 can receive, for instance, from other transportation vehicles, from traffic infrastructure or from a central system, for instance, a regional or global congestion-reporting system. Appliance 12 may, for instance, be designed to receive the congestion warnings via a so-called Decentralized Environmental Notification Message (DENM), via the vehicle-to-vehicle interface 16, perhaps from another transportation vehicle or from a traffic infrastructure, perhaps a congestion-reporting station on a freeway. In some disclosed embodiments, the congestion warnings may, for instance, include information about an end of a traffic jam from a further transportation vehicle.

In some disclosed embodiments, appliance 12 can acquire the congestion warnings via a sensor module or an interface. For instance, the appliance may receive a signal that the hazard-warning flashers of transportation vehicle 100 are activated. Appliance 12 may, for instance, include a video sensor or access a video sensor, to detect hazard-warning systems of transportation vehicles in a neighborhood of transportation vehicle 100. For instance, the video sensor may react only to light pertaining to one wavelength range, to detect the hazard-warning systems. Appliance 12 may be designed to analyze raw data of the sensor module, perhaps of the video sensor, to determine the indicators.

The device 10 further includes an appliance 14 designed to determine information about an end of a traffic jam on the basis of the indicators, the information about the end of a traffic jam indicating whether transportation vehicle 100 will reach the end of a traffic jam in the near future. The information about the end of a traffic jam may, for instance, correspond to a data packet or a data signal. For instance, the data packet or the data signal may include the information about the end of a traffic jam; for instance, the information about the end of a traffic jam may be a part of the data packet. In an exemplary embodiment, the information about the end of a traffic jam may be information pertaining to a series of items of status information pertaining to transportation vehicle 100 in a status message, for instance, one or more bits in a bit vector, in which case a 0 in the bit vector could signify, for instance, that transportation vehicle 100 is not located at an end of a traffic jam, and a 1 could signify that the transportation vehicle is located at an end of a traffic jam. Furthermore, the data packet or the status information may include, for instance, information about a confidence interval for the information about the end of a traffic jam, for instance, to indicate how conclusively appliance 14 assesses the information about the end of a traffic jam. Appliance 14 may, for instance, include a computation module or correspond to a computation module that computes and codes the information about the end of the traffic jam from the indicators, and/or, for instance, computes a probability that the particular information about the end of the traffic jam is true.

Indicators that appliance 14 has received via appliance 12 and via the vehicle-to-vehicle interface 16 (or via a sensor module) can be checked by the appliance, for instance, for their relevance for transportation vehicle 100. For instance, appliance 14 can check whether the direction of travel of a further transportation vehicle to which the indicator relates coincides with the direction of travel of transportation vehicle 100, whether a position of the further transportation vehicle is relevant (it can, for instance, track on a digital map whether the further transportation vehicle is located on a turning lane), or whether a range of the further transportation vehicle is too great.

Figure 2:
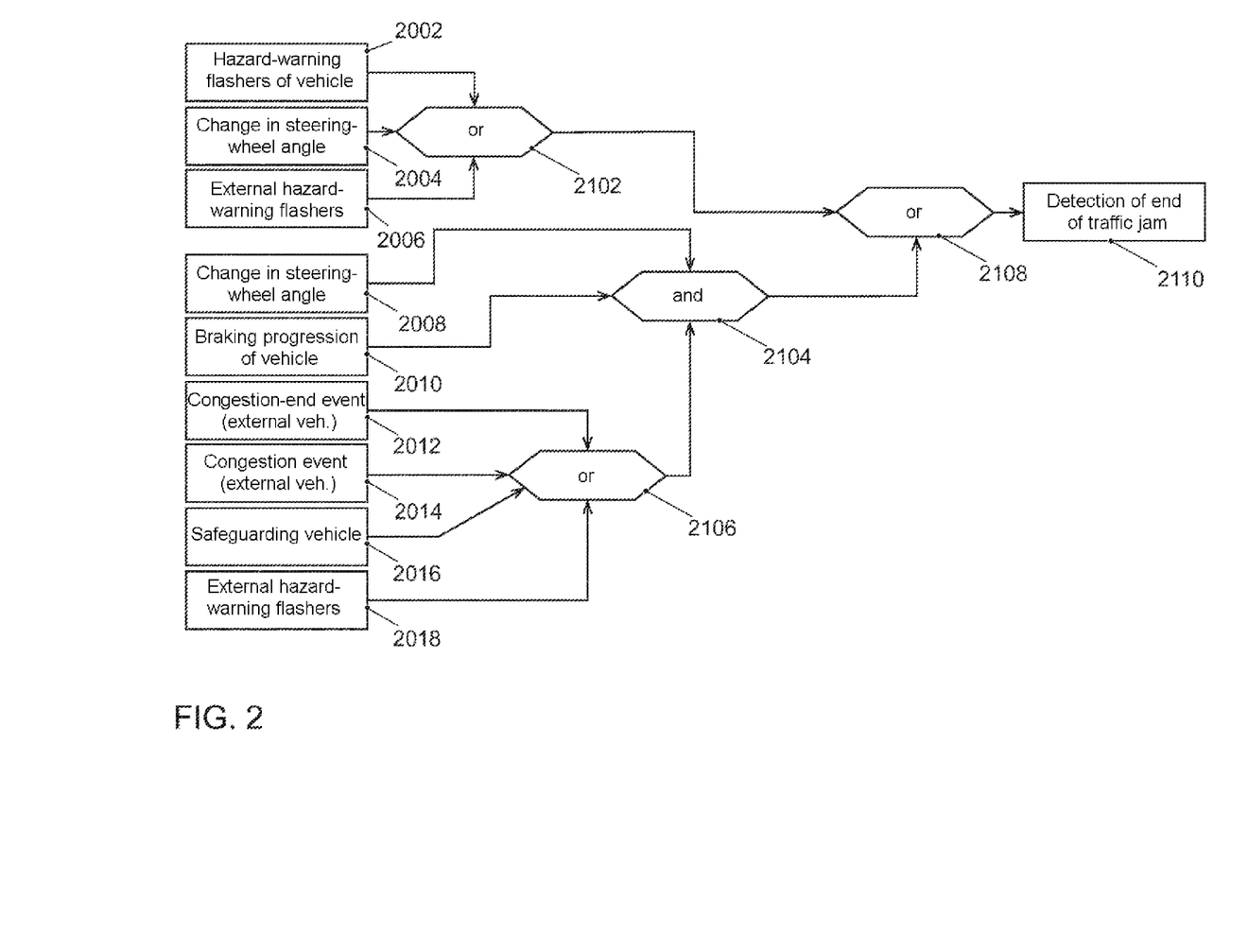
FIG. 2 shows an exemplary overview of possible combinations of congestion indicators for the determination of the congestion information.

FIG. 2 shows an exemplary overview of possible combinations of indicators for the determination of the information about the end of a traffic jam. FIG. 2 shows, by way of example, the indicators constituted by: hazard-warning flashers of the transportation vehicle 2002, change in steering-wheel angle 2004; 2008, external hazard-warning flashers 2006; 2018 (hazard-warning flashers of transportation vehicles in a neighborhood of transportation vehicle 100), braking progression of the transportation vehicle 2010, congestion-end event of transportation vehicles in a neighborhood of transportation vehicle 100 2012, congestion event of transportation vehicles in a neighborhood of transportation vehicle 100 2014, and safeguarding transportation vehicle 2016. The congestion warnings may, for instance, include indicators 2002, 2006, 2012, 2014, 2016 and 2018, and the kinetic information may include indicators 2004, 2008 and 2010.

Appliance 14 may, for instance, be designed to determine that transportation vehicle 100 will reach the end of a traffic jam in the near future if the hazard-warning flashers of transportation vehicle 100 have been activated (2002) for at least a minimum duration within a measuring period, the hazard-warning flashers of transportation vehicles in a neighborhood of transportation vehicle 100 have been activated (2006) and 2102 for at least a minimum duration within a measuring period, the steering angle of transportation vehicle 100 during a further measuring period having been substantially less than an upper limiting value of the steering angle (2004). The minimum duration may be, for instance, between 2 seconds and 5 seconds. The measuring period may, for instance, have a duration from 5 s to 30 s. The further measuring period may, for instance, have a duration between 30 s and 90 s. The upper speed limit may, for instance, be between 60 km/h and 100 km/h. The lower speed limit may, for instance, be between 20 km/h and 40 km/h. The limiting value of the steering angle may, for instance, correspond to a change in the steering-wheel angle of less than 45°, 75°, 90°, 105° or 120° from a normal position. In at least some disclosed embodiments, the limiting value of the steering-wheel angle may be utilized to establish that transportation vehicle 100 is traveling along lanes of a freeway and is not, for instance, turning off at an exit and, therefore, decelerating. In some disclosed embodiments, the steering angle can be utilized to confirm, at least partially, a plausibility of a trip on an expressway or freeway. In some disclosed embodiments, the steering angle may, for instance, be based on a satellite positioning or on sensor data, perhaps video-sensor data or acceleration-sensor data. Indicator 2004 may accordingly indicate, for instance, that the steering-wheel angle of transportation vehicle 100 was less than 90° in the last 60 seconds—that is to say, the transportation vehicle has been traveling substantially straight ahead.

A further exemplary option to detect a traffic jam is offered by indicators 2008 to 2018. Appliance 14 may be designed to determine that transportation vehicle 100 will reach the end of a traffic jam in the near future if the steering angle of transportation vehicle 100 during the further measuring period (2008) has been substantially less than an upper limiting value of the steering angle, transportation vehicle 100 was decelerated from above an upper speed limit to below a lower speed limit (2010), and 2104, a further indicator indicating an end of a traffic jam (2012-2018). The further indicator may correspond, for instance, to an activation of hazard-warning flashers of transportation vehicles in a neighborhood of transportation vehicle 100 for a minimum duration, for instance, within a measuring period. For instance, the further indicator may correspond to an activation of the hazard-warning flashers of transportation vehicles in a neighborhood of transportation vehicle 100 for 3 seconds (2018). Alternatively or additionally, the further indicator may correspond to a reception of information about an end of a traffic jam from a further transportation vehicle (2012). The further transportation vehicle may, for instance, likewise include the device 10, to provide the information about the end of a traffic jam. The further indicator may furthermore correspond to a reception of the congestion warnings from a plurality of further transportation vehicles (2014), or 2106 to a reception of the information about a safety transportation vehicle (2016). The information about a safety transportation vehicle may, for instance, also correspond to a CAM or to a DENM and/or indicate that a safety transportation vehicle—for instance, a rescue transportation vehicle, a recovery transportation vehicle or a police transportation vehicle—is approaching the current position or is located in the vicinity. Safety transportation vehicles may, for instance, exhibit one or more bits in a bit vector of a CAM that indicate that they are safety transportation vehicles. Both exemplary options to determine the information about the end of a traffic jam may, for instance, be utilized alternatively or simultaneously 2108 to determine the information about the end of a traffic jam 2110.

The device 10 further includes the vehicle-to-vehicle interface 16, designed to provide the information about the end of a traffic jam to one or more further transportation vehicles 200 via a vehicle-to-vehicle communication link. The vehicle-to-vehicle communication link may, for instance, take place via a shared communication channel (also known as a broadcast channel), and the vehicle-to-vehicle interface 16 may be designed to provide the information about the end of a traffic jam to the further transportation vehicles 200 as a message to several recipients (also known as a broadcast) via the vehicle-to-vehicle communication link. In some disclosed embodiments, the vehicle-to-vehicle communication link may correspond to a direct communication link between two transportation vehicles, for instance, without the use of a base station, perhaps in accordance with IEEE 802.11p (a standard of the Institute of Electrical and Electronics Engineers).

In some disclosed embodiments, the vehicle-to-vehicle interface 16 may furthermore be designed for vehicle-to-infrastructure communication. Appliance 14 may, for instance, be designed to provide the information about the end of a traffic jam furthermore to a traffic infrastructure via the vehicle-to-vehicle interface 16, for instance, by a periodic status message, perhaps a CAM, or via an event-based message, perhaps a DENM.

In some disclosed embodiments, appliance 14 is designed to transmit the information about the end of a traffic jam repeatedly, for instance, on the basis of a (possibly standardized) repetition interval and on the basis of a repetition duration. In this case, a time-blocker, for instance, can be set not to inundate the radio channel. The periodic status message may, for instance, include a bit vector that represents a state of the transportation vehicle, and the congestion information may, for instance, be included in one or more bits of the bit vector. The periodic status message may, for instance, be sent with a repetition frequency of 1 to 10 repetitions per second. The event-based message (perhaps DENM) can likewise be repeated and may include the information about the end of a traffic jam and furthermore, for instance, a reason (perhaps the indicator) for the information about the end of a traffic jam and a position of the transportation vehicle or of the traffic jam. For instance, the information about the end of a traffic jam may be represented with the aid of a scale, perhaps based on a confidence interval.

Figure 3:
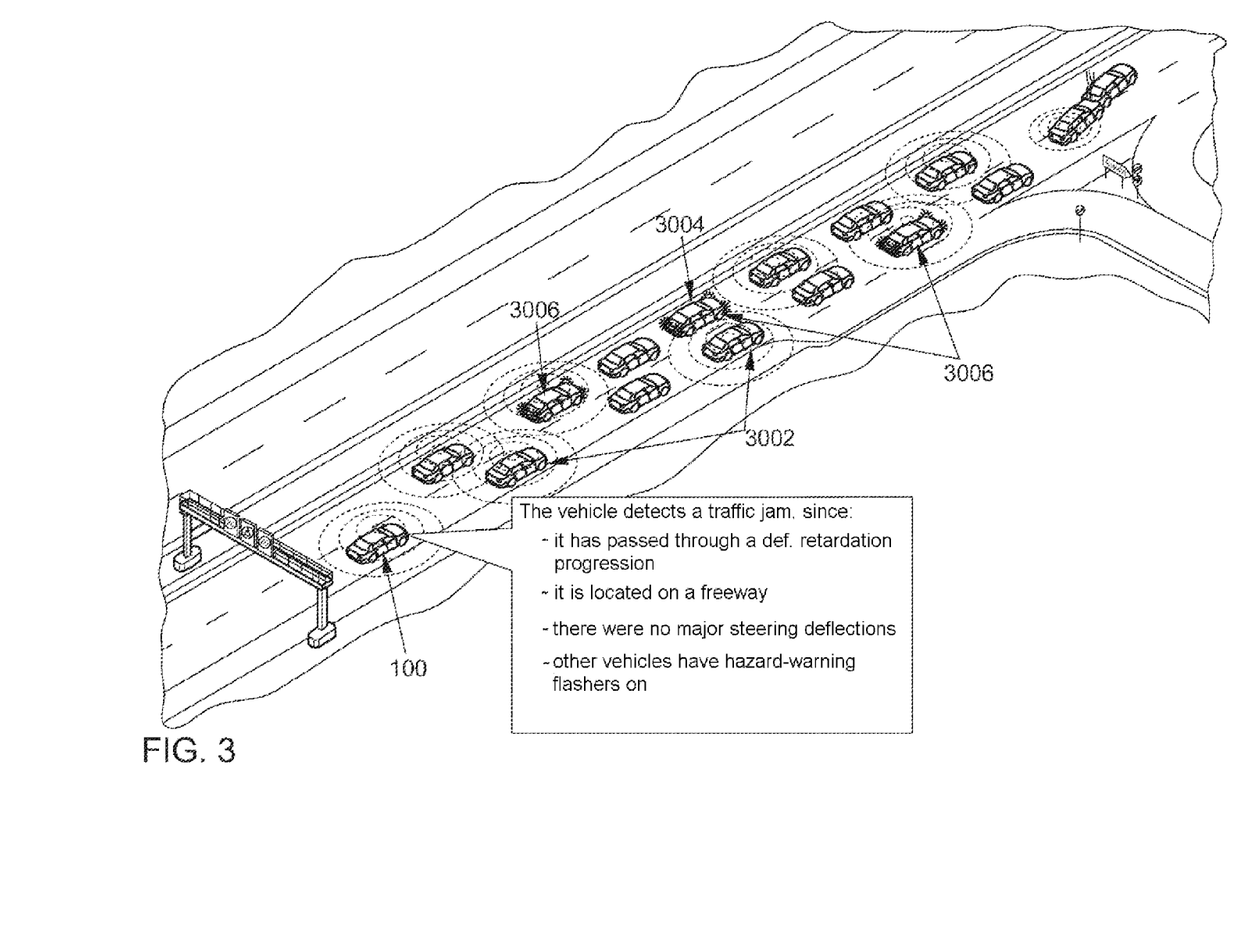
FIG. 3 shows an exemplary embodiment.

FIG. 3 shows an exemplary embodiment in which transportation vehicle 100 is located at an end of a traffic jam. Appliance 14 detects a traffic jam by virtue of the fact that transportation vehicle 100 was decelerated (2010) from above an upper speed limit to below a lower speed limit, it is located on a freeway, there were no major steering deflections (2008), and other transportation vehicles 3006 have activated hazard-warning flashers. Appliance 14 is designed, by way of example, to detect the hazard-warning flashers 3006 of the transportation vehicles in the neighborhood via the vehicle-to-vehicle interface 16 (transportation vehicles 3002, recognizable from the schematically represented radio signals) or via a sensor module (transportation vehicles without vehicle-to-vehicle interface 3004).

In disclosed embodiments, appliance 12 and/or appliance 14 may correspond to an arbitrary controller or processor or to a programmable hardware component. For instance, appliance 12 and/or appliance 14 may also be realized as software that has been programmed for a corresponding hardware component. In this respect, appliance 12 and/or appliance 14 may be implemented as programmable hardware with correspondingly adapted software. In this case, arbitrary processors, such as digital signal processors (DSPs), may come into operation. Disclosed embodiments in this case are not restricted to a particular type of processor. Arbitrary processors or even several processors are can for implementing appliance 12 and/or appliance 14. Appliance 14 is coupled with appliance 12 and with the vehicle-to-vehicle interface 16.

In a disclosed embodiment, the vehicle-to-vehicle interface 16 corresponds to a direct vehicle-to-vehicle radio interface. The vehicle-to-vehicle interface 16 may, for instance, be designed for a direct data communication with the one or more further transportation vehicles, for instance, in accordance with IEEE 802.11p. The device 10 may, for instance, exchange data messages with transportation vehicles in its neighborhood via the vehicle-to-vehicle interface 16. The data messages may, for instance, be transmitted periodically—that is to say, data, for instance, data concerning a status of the transportation vehicle, perhaps its speed, position, etc., are transmitted with a defined repetition frequency. Alternatively or additionally, the data messages may be transmitted in event-based manner—that is to say, on the basis of an event such as, for example, the detection of an end of a traffic jam or a detection of a slippery roadway. Event-based data messages can also be repeated, for instance, with a defined repetition duration and repetition frequency, perhaps to reach more recipients or to increase a probability of a reception of the data messages. The Cooperative Awareness Messages (periodic data messages that a transportation vehicle sends out to make its presence known to other transportation vehicles) are an example of periodic data messages; Decentralized Environmental Notification Message (DENM) are an example of event-based data messages. These data messages may, for instance, receive current information about transportation vehicle 100, for instance, the position and the motion vector, but also, for instance, sensor data such as an acceleration, speed, or computed information such as the information about the end of the traffic jam. In some disclosed embodiments, the vehicle-to-vehicle interface 16 may enable a transmission of data messages via a shared channel, and/or the vehicle-to-vehicle interface 16 may enable a transmission of data messages without a multilateral connection setup, and/or the vehicle-to-vehicle interface 16 may correspond to a distribution radio interface (also known as a broadcast) for distributing data messages to a plurality of recipients. In some disclosed embodiments, the vehicle-to-vehicle interface 16 can communicate over frequencies within a 5.9 GHz frequency range (for example, between 5.85 GHz and 5.925 GHz).

In at least some disclosed embodiments, a transportation vehicle, perhaps transportation vehicle 100 or the one or more further transportation vehicles 200, may correspond to, for instance, a land transportation vehicle, a road transportation vehicle, a car, an off-road transportation vehicle, a transportation vehicle, or a goods transportation vehicle.

Figure 4:
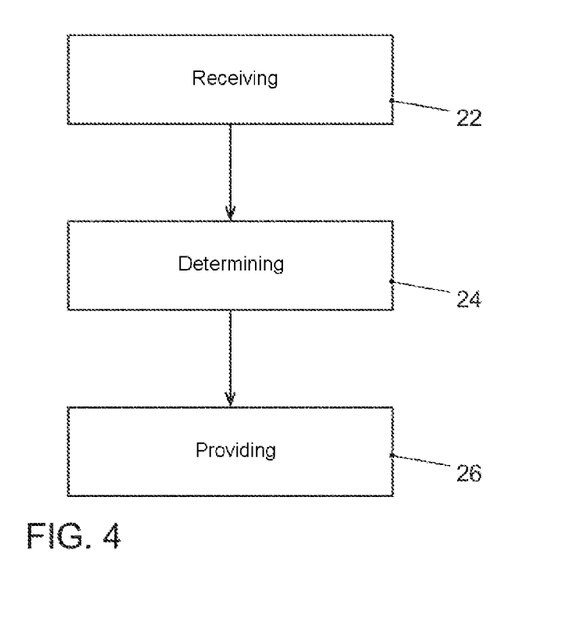
FIG. 4 shows a flow chart of a disclosed embodiment of a device for a transportation vehicle for providing the information about the end of a traffic jam.

FIG. 4 shows a flowchart of a method for a transportation vehicle 100. The method includes receiving 22 indicators of an end of a traffic jam. The indicators include at least one element of the group comprising kinetic information pertaining to transportation vehicle 100, or to transportation vehicles in a neighborhood of transportation vehicle 100, and congestion warnings. The method further includes determining 24 information about an end of a traffic jam on the basis of the indicators. The information about the end of a traffic jam indicates whether transportation vehicle 100 will reach the end of a traffic jam in the near future. The method further includes providing 26 the information about the end of a traffic jam to one or more further transportation vehicles 200 via a vehicle-to-vehicle communication link.

Disclosed embodiments further create a transportation vehicle (100) including the device (10).

A further disclosed embodiment is a computer program for implementing the method when the computer program runs on a computer, on a processor or on a programmable hardware component. A further disclosed embodiment is also a digital storage medium that is machine-readable or computer-readable and that exhibits electronically readable control signals that can interact with a programmable hardware component in such a way that one of the methods described above is executed.

The features disclosed in the foregoing description, in the following claims and in the appended figures may be of importance and implemented both individually and in arbitrary combination for the realization of an embodiment in its various configurations.

Depending upon implementation requirements, disclosed embodiments may have been implemented in hardware or in software. The implementation may carried out using a digital storage medium, for instance, a floppy disk, a DVD, a Blu-ray disc, a CD, a ROM, a PROM, an EPROM, an EEPROM or a flash memory, a hard disk, or another magnetic or optical memory on which electronically readable control signals are stored that can interact or interact with a programmable hardware component in such a manner that the respective method is carried out.

A programmable hardware component may be constituted by a processor, a computer processor (CPU=central processing unit), a graphics processor (GPU=graphics processing unit), a computer, a computer system, an application-specific integrated circuit (ASIC), an integrated circuit (IC), a one-chip system (SOC=system on chip), a programmable logic element or a field-programmable gate array with a microprocessor (FPGA).

The digital storage medium may, therefore, be machine-readable or computer-readable. Accordingly, some disclosed embodiments include a data carrier that exhibits electronically readable control signals that are capable of interacting with a programmable computer system or with a programmable hardware component in such a manner that one of the methods described herein is carried out. A disclosed embodiment is consequently a data carrier (or a digital storage medium or a computer-readable medium) on which the program for implementing one of the methods described herein has been recorded.

In general, disclosed embodiments may have been implemented as a program, firmware, computer program or computer-program product having a program code, or as data, the program code or the data being effective to implement one of the methods when the program runs on a processor or on a computer-programmable hardware component. The program code or the data may, for instance, also have been stored on a machine-readable carrier or data carrier. The program code or the data may be present as, amongst other things, source code, machine code or byte code, and also as other intermediate code.

A program according to at least one disclosed embodiment can put one of the methods into effect during its implementation, for instance, by virtue of the fact that the program reads out memory locations or writes a data item or several data items to the memory locations, as a result of which, where appropriate, switching operations or other operations are brought about in transistor structures, in amplifier structures or in other electrical, optical or magnetic components or in components operating in accordance with a different functional principle. Accordingly, data, values, sensor values or other information can be acquired, determined or measured by a program, by reading a memory location. A program can, therefore, acquire, determine or measure quantities, values, measured variables and other information by reading out one or more memory locations, and can also bring about, cause or carry out an action and also drive other instruments, machines and components by writing to one or more memory locations.

The embodiments described above represent merely an illustration of the principles of the disclosure. It will be understood that modifications and variations of the arrangements and particulars described herein will be clear to other persons skilled in the art. Therefore, it is intended that the disclosure be restricted only by the scope of protection of the following claims and not by the specific particulars that have been presented herein on the basis of the description and the elucidation of the disclosed embodiments.

LIST OF REFERENCE SYMBOLS

10 Device
12 Appliance

14 Appliance
16 Vehicle-to-vehicle interface
22 Receiving
24 Determining
26 Providing
100 Transportation vehicle
200 Further transportation vehicles
2002 Hazard-warning flashers of the transportation vehicle
2004 Change in steering-wheel angle
2006 External hazard-warning flashers
2008 Change in steering-wheel angle
2010 Braking progression of the transportation vehicle
2012 Congestion-end event of transportation vehicles in a neighborhood of the transportation vehicle
2014 Congestion event of transportation vehicles in a neighborhood of the transportation vehicle
2016 Safeguarding transportation vehicle
2018 External hazard-warning flashers
2102 And
2104 And
2106 Or
2108 Or
2110 Detection of end of a traffic jam
3002 Transportation vehicles with vehicle-to-vehicle interface
3004 Transportation vehicles without vehicle-to-vehicle interface
3006 Hazard-warning flashers

The invention claimed is:

1. A device for a transportation vehicle, the device comprising:
a first appliance configured to receive one or more indicators of an end of a traffic jam;
a second appliance configured to determine information about an end of a traffic jam based on the indicators, the information about the end of a traffic jam indicating whether the transportation vehicle will reach the end of a traffic jam in the near future; and
a vehicle-to-vehicle interface to provide the information about the end of a traffic jam to one or more further transportation vehicles via a vehicle-to-vehicle communication link,
wherein the second appliance determines that the transportation vehicle will reach the end of a traffic jam in the near future in response to the indicators including at least one of:
hazard-warning flashers of the transportation vehicle having been activated for at least a minimum duration within a measuring period, hazard-warning flashers of transportation vehicles in a neighborhood of the transportation vehicle having been activated for at least a minimum duration within the measuring period, and a steering angle of the transportation vehicle during a further measuring period has been substantially less than an upper limiting value of the steering angle; and
a steering angle of the transportation vehicle during a further measuring period having been substantially less than an upper limiting value of the steering angle, the transportation vehicle was decelerated from above an upper speed limit to below a lower speed limit, and a further indicator indicates an end of a traffic jam.

2. The device of claim 1, wherein the indicators further include kinetic information corresponding to at least one of speed information, acceleration information, and steering-angle information for the transportation vehicle or a transportation vehicle in a neighborhood of the transportation vehicle.

3. The device of claim 1, wherein the indicators further include congestion warnings including at least one of hazard-warning flashers of the transportation vehicle, hazard-warning flashers of transportation vehicles in a neighborhood of the transportation vehicle, information about a safety transportation vehicle, information about an end of a traffic jam from another transportation vehicle, and congestion-warning messages.

4. The device of claim 3, wherein the first appliance receives the congestion warnings via a vehicle-to-infrastructure communication link, via a vehicle-to-vehicle communication link, via a mobile communication system, or via a sensor module.

5. The device of claim 3, wherein the first appliance receives the congestion warnings via a Decentralized Environmental Notification Message via the vehicle-to-vehicle interface.

6. The device of claim 1, wherein the further indicator corresponds to at least one of:
an activation of hazard-warning flashers of transportation vehicles in a neighborhood of the transportation vehicle for a minimum duration within a measuring period;
a reception of information about an end of a traffic jam from a further transportation vehicle;
a reception of congestion warnings from a plurality of further transportation vehicles; and
a reception of information about a safety transportation vehicle.

7. The device of claim 1, wherein the minimum duration is between 2 seconds and 5 seconds,
wherein the measuring period has a duration from 5 s to 30 s,
wherein the further measuring period has a duration between 30 s and 90 s,
wherein the upper speed limit is between 60 km/h and 100 km/h, and
wherein the lower speed limit is between 20 km/h and 40 km/h.

8. The device of claim 1, wherein the vehicle-to-vehicle interface is designed for vehicle-to-infrastructure communication.

9. The device of claim 8, wherein the second appliance provides the information about the end of a traffic jam to a traffic infrastructure via the vehicle-to-vehicle interface.

10. The device of claim 1, wherein the second appliance provides the information about the end of a traffic jam as a Cooperative Awareness Message via the vehicle-to-vehicle interface.

11. The device of claim 1, wherein the first appliance includes a sensor module and/or an input interface, and/or wherein the second appliance includes a computation module and/or corresponds to a computation module.

12. A method for a transportation vehicle, the method comprising:
receiving one or more indicators of an end of a traffic jam;
determining information about an end of a traffic jam based on the indicators, the information about the end of a traffic jam indicating whether the transportation vehicle will reach the end of a traffic jam in the near future; and
providing the information about the end of a traffic jam to one or more further transportation vehicles via a vehicle-to-vehicle communication link, wherein it is determined that the transportation vehicle will reach the end of a traffic jam in the near future in response to the indicators including at least one of:
hazard-warning flashers of the transportation vehicle having been activated for at least a minimum duration within a measuring period, hazard-warning flashers of transportation vehicles in a neighborhood of the transportation vehicle having been activated for at least a minimum duration within the measuring period, and a steering angle of the transportation vehicle during a further measuring period has been substantially less than an upper limiting value of the steering angle; and a steering angle of the transportation vehicle during a further measuring period having been substantially less than an upper limiting value of the steering angle, the transportation vehicle was decelerated from above an upper speed limit to below a lower speed limit, and a further indicator indicates an end of a traffic jam.

13. The method of claim 12, wherein the indicators further include kinetic information corresponding to at least one of speed information, acceleration information, and steering-angle information for the transportation vehicle or a transportation vehicle in a neighborhood of the transportation vehicle.

14. The method of claim 12, wherein the indicators further include congestion warnings including at least one of hazard-warning flashers of the transportation vehicle, hazard-warning flashers of transportation vehicles in a neighborhood of the transportation vehicle, information about a safety transportation vehicle, information about an end of a traffic jam from another transportation vehicle, and congestion-warning messages.

15. The method of claim 12, wherein the further indicator corresponds to at least one of:
an activation of hazard-warning flashers of transportation vehicles in a neighborhood of the transportation vehicle for a minimum duration within a measuring period;
a reception of information about an end of a traffic jam from a further transportation vehicle;
a reception of congestion warnings from a plurality of further transportation vehicles; and
a reception of information about a safety transportation vehicle.

16. The method of claim 12, wherein the minimum duration is between 2 seconds and 5 seconds,
wherein the measuring period has a duration from 5 s to 30 s,
wherein the further measuring period has a duration between 30 s and 90 s,
wherein the upper speed limit is between 60 km/h and 100 km/h, and
wherein the lower speed limit is between 20 km/h and 40 km/h.

17. A non-transitory computer readable medium comprising: a program including program code for carrying out a method for a transportation vehicle when the program code is executed on a computer, on a processor, on a control module or on a programmable hardware component, wherein the method comprises:
receiving one or more indicators of an end of a traffic jam;
determining information about an end of a traffic jam based on the indicators, the information about the end of a traffic jam indicating whether the transportation vehicle will reach the end of a traffic jam in the near future; and
providing the information about the end of a traffic jam to one or more further transportation vehicles via a vehicle-to-vehicle communication link,
wherein it is determined that the transportation vehicle will reach the end of a traffic jam in the near future in response to the indicators including at least one of:
hazard-warning flashers of the transportation vehicle having been activated for at least a minimum duration within a measuring period, hazard-warning flashers of transportation vehicles in a neighborhood of the transportation vehicle having been activated for at least a minimum duration within the measuring period, and a steering angle of the transportation vehicle during a further measuring period has been substantially less than an upper limiting value of the steering angle; and a steering angle of the transportation vehicle during a further measuring period having been substantially less than an upper limiting value of the steering angle, the transportation vehicle was decelerated from above an upper speed limit to below a lower speed limit, and a further indicator indicates an end of a traffic jam.

18. The non-transitory computer readable medium of claim 17, wherein the indicators further include kinetic information corresponding to at least one of speed information, acceleration information, and steering-angle information for the transportation vehicle or a transportation vehicle in a neighborhood of the transportation vehicle.

19. The non-transitory computer readable medium of claim 17, wherein the indicators further include congestion warnings including at least one of hazard-warning flashers of the transportation vehicle, hazard-warning flashers of transportation vehicles in a neighborhood of the transportation vehicle, information about a safety transportation vehicle, information about an end of a traffic jam from another transportation vehicle, and congestion-warning messages.

20. The non-transitory computer readable medium of claim 17, wherein the further indicator corresponds to at least one of:
an activation of hazard-warning flashers of transportation vehicles in a neighborhood of the transportation vehicle for a minimum duration within a measuring period;
a reception of information about an end of a traffic jam from a further transportation vehicle;
a reception of congestion warnings from a plurality of further transportation vehicles; and
a reception of information about a safety transportation vehicle.

21. The non-transitory computer readable medium of claim 17, wherein the minimum duration is between 2 seconds and 5 seconds,
wherein the measuring period has a duration from 5 s to 30 s,
wherein the further measuring period has a duration between 30 s and 90 s,
wherein the upper speed limit is between 60 km/h and 100 km/h, and
wherein the lower speed limit is between 20 km/h and 40 km/h.

* * * * *